United States Patent
Shinke et al.

(10) Patent No.: US 11,367,887 B2
(45) Date of Patent: Jun. 21, 2022

(54) FUEL CELL SYSTEM AND METHOD FOR OPERATING FUEL CELL SYSTEM

(71) Applicant: Osaka Gas Co., Ltd., Osaka (JP)

(72) Inventors: Noritoshi Shinke, Osaka (JP);
Mitsuaki Echigo, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 9 days.

(21) Appl. No.: 16/976,205

(22) PCT Filed: Mar. 6, 2019

(86) PCT No.: PCT/JP2019/008945
§ 371 (c)(1),
(2) Date: Aug. 27, 2020

(87) PCT Pub. No.: WO2019/172337
PCT Pub. Date: Sep. 12, 2019

(65) Prior Publication Data
US 2021/0005910 A1    Jan. 7, 2021

(30) Foreign Application Priority Data

Mar. 7, 2018 (JP) .............................. JP2018-040449

(51) Int. Cl.
*H01M 8/0612* (2016.01)
*C01B 3/38* (2006.01)
(Continued)

(52) U.S. Cl.
CPC ........... *H01M 8/0618* (2013.01); *C01B 3/384* (2013.01); *H01M 8/04022* (2013.01);
(Continued)

(58) Field of Classification Search
CPC ........... H01M 8/0618; H01M 8/04022; H01M 8/04067; H01M 8/04164; H01M 8/04716;
(Continued)

(56) References Cited

U.S. PATENT DOCUMENTS

2005/0106429 A1* 5/2005 Keefer .............. H01M 8/04097
429/410
2006/0159970 A1   7/2006 Kato et al.
(Continued)

FOREIGN PATENT DOCUMENTS

JP    2011210634 A    10/2011
JP    2014089919 A     5/2014
(Continued)

OTHER PUBLICATIONS

Extended European Search Report issued in EP19765073.2 dated Oct. 27, 2021.

*Primary Examiner* — Matthew J Merkling
(74) *Attorney, Agent, or Firm* — The Webb Law Firm

(57) ABSTRACT

Provided is a fuel cell system capable of further increasing electric power generation efficiency, compared to the current circumstances, with respect to a fuel cell SOFC that generates electric power by supplying a reformed gas obtained by steam reforming to a fuel electrode. A steam reformer that reforms a hydrocarbon fuel by a steam reforming reaction; a fuel cell that operates by introducing a reformed gas to a fuel electrode; and an anode off-gas circulation path that removes condensed water while cooling an anode off-gas, and introduces the anode off-gas to the steam reformer are provided. A condensation temperature in a condensing device is controlled by a control unit that controls a steam partial pressure of the anode off-gas circulated to the steam reformer, and S/C adjustment is adapted to high-efficiency electric power generation.

21 Claims, 3 Drawing Sheets

(51) Int. Cl.
*H01M 8/04014* (2016.01)
*H01M 8/04007* (2016.01)
*H01M 8/04119* (2016.01)
*H01M 8/04701* (2016.01)
*H01M 8/04746* (2016.01)
*H01M 8/04791* (2016.01)
*H01M 8/04828* (2016.01)
*H01M 8/0662* (2016.01)
*H01M 8/12* (2016.01)
*H01M 8/1231* (2016.01)

(52) U.S. Cl.
CPC ... *H01M 8/04067* (2013.01); *H01M 8/04164* (2013.01); *H01M 8/04716* (2013.01); *H01M 8/04761* (2013.01); *H01M 8/04776* (2013.01); *H01M 8/04798* (2013.01); *H01M 8/04843* (2013.01); *H01M 8/0675* (2013.01); *C01B 3/38* (2013.01); *C01B 2203/0233* (2013.01); *C01B 2203/066* (2013.01); *C01B 2203/0816* (2013.01); *C01B 2203/0883* (2013.01); *C01B 2203/127* (2013.01); *C01B 2203/1235* (2013.01); *H01M 8/1231* (2016.02); *H01M 2008/1293* (2013.01)

(58) Field of Classification Search
CPC ......... H01M 8/04761; H01M 8/04776; H01M 8/04798; H01M 8/04843; C01B 3/384; C01B 2203/0233; C01B 2203/066; C01B 2203/0816; C01B 2203/0883; C01B 2203/1235; C01B 2203/127
See application file for complete search history.

(56) References Cited

U.S. PATENT DOCUMENTS

| | | | | |
|---|---|---|---|---|
| 2007/0196706 | A1* | 8/2007 | Sasaki | H01M 8/04768 429/414 |
| 2010/0279188 | A1* | 11/2010 | Miyauchi | H01M 8/04343 429/429 |
| 2012/0214076 | A1* | 8/2012 | Hakala | H01M 8/0618 429/427 |
| 2013/0089797 | A1* | 4/2013 | Falta | H01M 8/04097 429/414 |
| 2015/0030943 | A1* | 1/2015 | Kobayashi | H01M 8/04022 429/410 |
| 2015/0270559 | A1* | 9/2015 | Onuma | H01M 8/04074 429/410 |
| 2017/0179503 | A1* | 6/2017 | Wang | H01M 8/0438 |
| 2018/0241060 | A1* | 8/2018 | Harbusch | H01M 8/0606 |

FOREIGN PATENT DOCUMENTS

| | | |
|---|---|---|
| WO | 2012165097 A1 | 12/2012 |
| WO | 2013087995 A1 | 6/2013 |
| WO | 2015029886 A1 | 5/2015 |

* cited by examiner

FUEL CELL SYSTEM AND METHOD FOR OPERATING FUEL CELL SYSTEM

CROSS-REFERENCE TO RELATED APPLICATIONS

This application is the United States national phase of International Application No. PCT/JP2019/008945 filed Mar. 6, 2019, and claims priority to Japanese Patent Application No. 2018-040449 filed Mar. 7, 2018, the disclosures of which are hereby incorporated by reference in their entirety.

SUMMARY OF THE INVENTION

Field of the Invention

The present invention relates to a fuel cell system including a steam reformer that reforms a hydrocarbon fuel by a steam reforming reaction, a fuel cell that operates by introducing a reformed gas obtained by the steam reformer to a fuel electrode, and an anode off-gas circulation path that removes condensed water while cooling an anode off-gas exhausted from the fuel electrode, and introduces the anode off-gas to the steam reformer; and an operation method therefor.

DESCRIPTION OF RELATED ART

As this type of fuel cell system, the techniques disclosed in JP-A-2011-210634 and JP-A-2014-089919 can be mentioned.

The object of the technique disclosed in JP-A-2011-210634 is to enable recycling of a gas containing hydrogen or the like regardless of a location in a system and to eliminate necessity for separately installing a moisture removing structure dedicated to the recycled gas. Therefore, a hydrogen production apparatus 1 including a desulfurizing unit 2, a reforming unit 6 (corresponding to the steam reformer of the present invention), and a selective oxidation reaction unit 8, and a fuel cell system including a fuel cell which generates electric power using a reformed gas generated by the hydrogen production apparatus 1 are proposed.

In addition, in paragraph [0039], in the fuel cell system shown in FIGS. 1 and 2, a functional unit which removes moisture contained in the recycled anode off-gas is disclosed as a moisture removing unit 44. The moisture removing unit 44 is provided between a cell stack 20 and a branch part BP3, and includes a heat exchanger 44A for cooling the anode off-gas and a drain recovery device 44B for recovering condensed water. Moreover, the moisture removing unit 44 is described as being conventionally incorporated in order to remove moisture from the anode off-gas before being supplied to a burner 10. The anode off-gas from which the moisture is removed by the moisture removing unit 44 is mixed with a raw fuel through a recycle line RL3.

The object of the technique disclosed in JP-A-2014-089919 is to provide a solid oxide fuel cell system in which carbon is unlikely to be deposited inside a reformer and the reformer (corresponding to the steam reformer of the present invention) is unlikely to overheat. Therefore, the reformer; a solid oxide fuel cell (corresponding to the fuel cell of the present invention); an anode off-gas recycle path; an anode off-gas supplier for adjusting a supply amount of the anode off-gas supplied to the reformer; an anode off-gas radiator for radiating heat from the anode off-gas to generate condensed water; a reformer temperature detector; and a controller for adjusting at least one of a supply amount of a reforming air, a supply amount of a raw material, and the supply amount of the anode off-gas by controlling at least one of a reforming air supplier, a raw material supplier, and an anode off-gas supplier based on the temperature of the reformer are provided.

An operation of a controller 19 is described as follows in paragraph [0052].

The controller 19 adjusts at least one of an amount of a reforming air supplied to the reformer 14, an amount of a raw material supplied to the reformer 14, and an amount of an anode off-gas supplied to the reformer 14 by controlling at least one of a reforming air supplier 10, a raw material supplier 12, and an anode off-gas supplier 24 based on a temperature of a reformer 14 detected by a reformer temperature detector 28.

Therefore, the technique disclosed in JP-A-2014-089919 intends to maintain the temperature of the reformer 14 in a favorable state.

Incidentally, in order to improve efficiency of the fuel cell, it is necessary to consume a fuel by electric power generation as much as possible. In this case, when a consumption rate is high, a fuel partial pressure on an outlet side of a fuel electrode is decreased, a fuel shortage state occurs, the performance of a fuel cell is adversely decreased, and thus a fatal damage to the cell may be caused due to uneven distribution of cell reactions.

On the other hand, in a fuel cell (for example, an oxygen-ion permeable electrolyte-type fuel cell (the solid oxide fuel cell SOFC belongs to this type)) which generates electric power by using hydrocarbon as a raw fuel and using a reformed gas (including hydrogen and carbon monoxide) obtained by a steam reforming reaction as a direct fuel of the fuel cell, increasing a reaction rate of the steam reforming reaction to generate as many reformed gases as possible and utilizing the reformed gases as many as possible for electric power generation contribute to the improvement in electric power generation efficiency. Therefore, it is necessary to increase both the reaction rate of the steam reforming and the utilization rate of the fuel gas (reformed gas) as much as possible.

However, under the current circumstances, when much electric power is generated in the fuel cell, amounts of water and carbon dioxide generated by an electric power generation reaction are increased accordingly. As a result, the higher steam partial pressure at the outlet of the fuel electrode of the fuel cell, the lower the fuel partial pressure of the direct fuel. Moreover, when the steam partial pressure higher than a predetermined value or an excessive amount of the anode off-gas is supplied to the steam reformer by recycling, the fuel partial pressure of the direct fuel is decreased. When the fuel partial pressure becomes too low, the amount of the fuel gas diffused and supplied to the fuel electrode is reduced. Therefore, the amount of the electric power generation reaction per unit area of the fuel electrode is reduced, and the amount of the heat generation of the fuel cell due to the electric power generation reaction is reduced. This phenomenon results in increasing a temperature difference between the outlet and the inlet of the fuel cell, and a fatal failure such as deformation and cracking of the fuel electrode due to non-uniformity in the temperature distribution by increasing the temperature difference between the outlet and the inlet of the fuel electrode is caused.

As one of methods for avoiding the problem, a method for reducing steam supplied together with the raw fuel from a supply side of the raw fuel to a steam reforming catalyst, in order to increase the fuel partial pressure, can be considered.

However, since an equilibrium composition in the steam reforming reaction tends to reduce a fuel such as hydrogen and carbon monoxide supplied to the fuel electrode, the partial pressure of the fuel gas supplied to the fuel cell is decreased, which is not a fundamental solution. Moreover, a method for increasing the reaction rate by further raising a steam reforming temperature can also be considered, but there is practically a limitation on a heat-resistant temperature of the steam reforming catalyst, and thus long-term durability of the catalyst is degraded due to raising in the steam reforming temperature.

As described above, under the current circumstances, in consideration of the fuel gas partial pressure at the outlet of the fuel electrode, which is acceptable to the fuel electrode of the fuel cell, when a fuel utilization rate (amount of fuel consumed in fuel cell/amount of fuel supplied to fuel cell) is 80%, a cell voltage is 0.8 V, and orthogonal transformation efficiency and auxiliary equipment efficiency are each 0.95 under the conditions in which a ratio between amounts of steam and carbon supplied to the steam reformer satisfies, for example, S/C ratio=2.6 and a steam reforming equilibrium temperature is about 670° C., output efficiency of alternating-current power is usually limited to 52% to 55%.

SUMMARY OF THE INVENTION

As described above, a main object of the present invention is to provide a fuel cell system capable of further increasing electric power generation efficiency, compared to the current circumstances, with respect to a fuel cell that generates electric power by supplying a reformed gas obtained by steam reforming to a fuel electrode, and to provide a method for operating such a fuel cell system.

In order to achieve the object, a first feature configuration of the present invention is that a fuel cell system includes: a steam reformer that reforms a hydrocarbon fuel by a steam reforming reaction; a fuel cell that operates by introducing a reformed gas obtained by the steam reformer to a fuel electrode; an anode off-gas circulation path that removes condensed water while cooling an anode off-gas exhausted from the fuel electrode, and introduces the anode off-gas to the steam reformer; and a control means that adjusts an amount of the condensed water removed from the anode off-gas circulation path, and controls a steam partial pressure of the anode off-gas circulated to the steam reformer.

In the fuel cell system of this configuration, to the steam reformer, the hydrocarbon fuel is supplied from a raw fuel supply side and the steam is supplied through the anode off-gas circulation path.

In addition, when both of them are supplied, the control means operates to adjust the steam partial pressure of the anode off-gas circulated from the anode off-gas circulation path. By performing such adjustment, for example, even when an amount of electric power generated by the fuel cell is increased and thus an amount of water generated in the fuel cell is increased, the steam partial pressure of the anode off-gas is reduced due to the condensation operation, and thus it is possible to supply steam required and sufficient for the steam reforming and increase the amount of the fuel gas supplied to the fuel cell through the steam reforming. Therefore, the amount of the hydrocarbon fuel, which is a raw material that can be fed to the steam reformer, can be properly adjusted, and as a result, electric power generation efficiency is improved.

The above description is main actions and effects obtained by adopting the first feature configuration of the present invention, but more specifically, the following actions and effects are exhibited.

Direct Actions and Effects Obtained by Controlling Steam Partial Pressure

1. Since the amount of the fuel gas supplied to the fuel cell can be increased, even when the amounts of electric power generated by the fuel cell are the same (which is the same as a case where the anode off-gas is not circulated), the fuel gas concentration at an outlet of the fuel electrode of the fuel cell can be increased. As a result, it is possible to avoid the problem described above in which the fuel gas partial pressure is excessively decreased at the outlet of the fuel electrode.

On the contrary, even in a case where a fuel consumed by the electric power generation reaction in the fuel cell is increased (a case where the electric power generation amount is increased), the fuel gas partial pressure on the outlet side of the fuel electrode can be secured as much as necessary, the fuel gas partial pressure can be secured at the outlet of the fuel electrode to the extent of the conventional level, and thus the problem does not occur.

2. Since the fuel gas partial pressures at the inlet and the outlet of the fuel electrode are close to each other, by uniformizing a current density in the fuel cell, local overheating due to electric power generation resistance is suppressed and long-term reliability of the fuel cell is improved.

As an example of a concrete investigation conducted by the inventors of the present invention, a difference in the fuel gas concentration at the inlet and the outlet of the fuel electrode, which is caused by increasing a flow rate of the fuel gas to the fuel cell due to the circulation of the anode off-gas, was about 54% in the conventional process (a fuel cell system S2 shown in FIG. 2) and was reduced to about 34% in the present invention (a fuel cell system S1 shown in FIG. 1). As also described above, the difference in the fuel gas concentration in the cell causes an increase in the temperature distribution due to uneven distribution of the electric power generation reaction, but in the present invention, due to relaxation of the concentration difference, thermal deformation of the fuel cell is alleviated and long-term durability is mitigated.

That is, by circulating the anode off-gas whose steam partial pressure is appropriately adjusted and controlled to the steam reformer, the electric power generation efficiency can be improved while securing the amount of the fuel gas suppliable to the fuel cell and the amount of steam required for reforming the fuel gas.

On the other hand, actions and effects obtained by using the steam held by the anode off-gas for reforming are as follows. These actions and effects are compared with those of the current solid oxide fuel cell system shown in FIG. 2.

1. During a normal operation in which generated electric power is supplied to the outside by following an electric power load, steam supplied to the steam reforming catalyst may include only the steam in the anode off-gas, and thus a substance which adversely affects the steam reforming catalyst, such as iron oxide, silica, and a sulfide, contained in a combustion exhaust gas or a cathode off-gas is not contained. As a result, poisoning of a catalyst of the reformer or contamination or blocking of a heat exchanger is suppressed, and the long-term reliability of the fuel cell process is improved.

2. In the fuel cell system according to the present invention, an electric power generation state where the condensed water is constantly exhausted can be realized in the normal operation, the constant exhaust amount can be secured to have the number of moles of about 15% with respect to the amount of the raw fuel, and thus concentration of fuel system contamination components in the process into the condensed water does not occur. Therefore, a possibility of fouling a catalyst or a device is eliminated, and thus the long-term reliability is improved.

3. Water contained in a combustion exhaust gas system and a cathode off-gas system is not used as water required for the steam reforming, and thus an advanced water treatment such as silica removal can be simplified or omitted.

Furthermore, since the condensed water can be constantly exhausted to the outside of the system, and contamination components eluted from a reactor, pipes, or valves are not concentrated, purity of water can be maintained for a long time without a water purifier.

By adopting this feature configuration, the method for operating a fuel cell system is a method for operating a fuel cell system which includes: a steam reformer that reforms a hydrocarbon fuel by a steam reforming reaction; a fuel cell that operates by introducing a reformed gas obtained by the steam reformer to a fuel electrode; and an anode off-gas circulation path that removes condensed water while cooling an anode off-gas exhausted from the fuel electrode, and introduces the anode off-gas to the steam reformer, in which an amount of condensed water removed from the anode off-gas circulation path is adjusted to adjust a steam partial pressure of the anode off-gas circulated to the steam reformer.

A second feature configuration of the present invention is that a condensing means capable of removing condensed water is provided on one or both of a discharge side and a suction side of a circulating means which circulates the anode off-gas to the steam reformer, and the control means adjusts a circulation amount by the circulating means and a condensation temperature in the condensing means to adjust an amount of steam circulated to the steam reformer.

By adopting this feature configuration, the condensing means is provided on one or both of the discharge side and the suction side of the circulating means, the steam partial pressure of the anode off-gas is controlled by adjusting the condensation temperature in the condensing means, and the amount of the steam circulated to the steam reformer is adjusted together with the circulation amount of the anode off-gas.

Since this control is substantially temperature control, a simple and highly reliable system can be constructed by using a readily available device.

The method for operating the fuel cell system adopting such a configuration is that a condensing means capable of removing condensed water is provided on one or both of a discharge side and a suction side of a circulating means which circulates the anode off-gas to the steam reformer, and the circulation amount by the circulating means and the condensation temperature in the condensing means are adjusted to adjust an amount of the steam circulated to the steam reformer.

A third feature configuration of the present invention is that in the anode off-gas circulation path, a cooling means that cools the anode off-gas flowing in the anode off-gas circulation path is provided between the condensing means and the fuel cell, and a temperature raising means that raises a temperature of the anode off-gas flowing in the anode off-gas circulation path is provided between the condensing means and the steam reformer.

By adopting this feature configuration, the cooling means and the temperature raising means are provided with the condensing means interposed therebetween, and thus the temperature of the gas flowing into the condensing means through the anode off-gas circulation path by the cooling means can be decreased to reduce the load on the condensing means. On the other hand, the temperature of the gas, which is discharged from the condensing means after the adjustment of the steam partial pressure thereof, is low and thus raising the temperature is required for the reforming reaction in the steam reformer, but the temperature can be raised to a temperature suitable for feeding to the steam reformer by the temperature raising means.

A fourth feature configuration of the present invention is that heat recovered by the cooling means is used in the temperature raising means.

By adopting this feature configuration, for example, heat held by an anode off-gas exhausted from a fuel cell operating at a relatively high temperature can be effectively utilized for the steam partial pressure control and the reforming reaction in the steam reformer. As a result, energy efficiency of the entire fuel cell system is improved.

A fifth feature configuration of the present invention is that in the anode off-gas circulation path, the anode off-gas is cooled to a temperature of higher than 50° C. and lower than 250° C.

By adopting this feature configuration, the anode off-gas is temporarily cooled to near room temperature and the condensed water is removed. Therefore, a volume flow rate of a fluid is reduced and a general-purpose high-efficiency air pump with a room temperature specification can be used for recirculation, which is economical.

In addition, a compressor such as a pump is required to cool and circulate the anode off-gas, but theoretical power efficiency of the compressor is increased due to an increase in the gas density by cooling, whereas an inexpensive compressor using an organic material or the like can be selected.

A sixth feature configuration of the present invention is that in an external power supply state where generated electric power is supplied to the outside by following an electric power load, with a configuration in which only the steam circulated through the anode off-gas circulation path is allowed to flow in as steam required for the steam reformer, the condensing means and the control means cooperate to operate as a S/C ratio adjusting means that adjusts a S/C ratio, which is a ratio of the amount of the steam circulated to the steam reformer to an amount of carbon input to the steam reformer.

By adopting this feature configuration, a supply ratio between the raw fuel and the steam supplied to the steam reformer can be set to be substantially dependent on the adjustment of the steam partial pressure in the condensing means, and thus the condensing means and the control means can be used as an adjustment means for the S/C ratio which is a ratio between the amounts of the steam and the carbon input to the steam reformer and further the entire fuel cell system. As a result, by favorably controlling the operation of the condensing means when a load on the fuel cell fluctuates, optional change and control can be performed, and load followability and reliability of the electric power generation can be improved.

The method for operating the fuel cell system adopting such a configuration is that in an external power supply state where generated electric power is supplied to the outside by following an electric power load, with a configuration in which only the steam circulated through the anode off-gas circulation path is allowed to flow in as steam required for the steam reformer, the condensing means is operated as a S/C ratio adjusting means that adjusts a S/C ratio, which is a ratio of the amount of the steam circulated to the steam reformer to an amount of carbon input to the steam reformer.

A seventh feature configuration of the present invention is that in the external power supply state where the generated electric power is supplied to the outside by following the electric power load, with a configuration in which only the steam circulated through the anode off-gas circulation path is allowed to flow in as steam required for the steam reformer, with respect to the electric power load, an appropriate S/C ratio is preset for a S/C ratio which is a ratio of the amount of the steam circulated to the steam reformer to an amount of carbon input to the steam reformer and a minimum fuel gas concentration is set for a fuel gas concentration at an outlet of the fuel electrode, and the condensing means and the control means cooperate to operate as a S/C ratio adjusting means that adjusts the S/C ratio to the appropriate S/C ratio, and control the steam partial pressure of the anode off-gas circulated to the steam reformer to a steam partial pressure that allows the hydrocarbon fuel, in an amount sufficient to maintain the fuel gas concentration at the outlet of the fuel electrode at the minimum fuel gas concentration or higher, to be input to the steam reformer.

By adopting this feature configuration, the supply ratio between the raw fuel and the steam supplied to the steam reformer can be set to be substantially dependent on the adjustment of the steam partial pressure in the condensing means. Moreover, the condensing means and the control means are used as the adjustment means for the S/C ratio, which is the ratio between the amounts of the steam and the carbon input to the steam reformer and further the entire fuel cell system, and adjust a S/C ratio of the gas input to the steam reformer to an appropriate S/C ratio. As a result, by favorably controlling the operation of the condensing means when a load on the fuel cell fluctuates, optional change and control can be performed, and load followability and reliability of the electric power generation can be improved.

In addition, as also described above, when the electric power load is increased, the fuel gas concentration at the outlet of the fuel electrode is decreased and the steam concentration is increased. However, by controlling the amount of the condensed water removed by the condensing means to properly control the states of the hydrocarbon fuel and the steam on an upstream side of the steam reformer and the fuel cell with respect to an increase in the electric power generation amount (an increase in water generated in the fuel cell), the fuel gas concentration at the outlet of the fuel electrode can be maintained at the minimum fuel gas concentration or higher to maintain a favorable operation.

The method for operating the fuel cell system adopting such a configuration is that in an external power supply state where generated electric power is supplied to the outside by following an electric power load, with a configuration in which only the steam circulated through the anode off-gas circulation path is allowed to flow in as steam required for the steam reformer, with respect to the electric power load, an appropriate S/C ratio is preset for a S/C ratio which is a ratio of an amount of the steam circulated to the steam reformer to an amount of carbon input to the steam reformer and a minimum fuel gas concentration is set for a fuel gas concentration at the outlet of the fuel electrode, the S/C ratio is adjusted to the appropriate S/C ratio, and the steam partial pressure of the anode off-gas circulated to the steam reformer is controlled to a steam partial pressure that allows the hydrocarbon fuel, in an amount sufficient to maintain the fuel gas concentration at the outlet of the fuel electrode at the minimum fuel gas concentration or higher, to be input to the steam reformer.

An eighth feature configuration of the present invention is that a path that supplies at least a part of the anode off-gas whose steam partial pressure is reduced to a desulfurization reactor is provided.

By adopting this feature configuration, a reducing gas contained in the gas can be used for desulfurization.

The method for operating the fuel cell system adopting such a configuration is that a path that supplies at least a part of the anode off-gas whose steam partial pressure is reduced to the desulfurization reactor is provided.

A ninth feature configuration of the present invention is that a desulfurization reactor that removes a sulfur component supplied together with the hydrocarbon fuel is provided, and the hydrocarbon fuel desulfurized so as to have a sulfur content of 1 vol. ppb or less in the desulfurization reactor is supplied to the steam reformer.

By adopting this feature configuration, the sulfur component (for example, an odorant added to the city gas) supplied together with the hydrocarbon fuel is removed, and thus adverse effects of the sulfur component on the steam reformer, the fuel cell, or the like can be reduced to ensure a stable operation for a long period of time.

Furthermore, supplying the hydrocarbon fuel, which is desulfurized so as to have a sulfur content of 0.1 vol. ppb or less, to the steam reformer is more preferable, because adverse effects of the sulfur component on the steam reformer, the fuel cell, or the like can be further reduced to ensure the stable operation for a longer period of time.

The method for operating the fuel cell system adopting such a configuration is that a desulfurization reactor that removes a sulfur component supplied together with the hydrocarbon fuel is provided, a sulfur content is desulfurized to preferably 1 vol. ppb or less and more preferably 0.1 vol. ppb or less in the desulfurization reactor, and the hydrocarbon fuel is supplied to the steam reformer.

A tenth feature configuration of the present invention is that regarding the anode off-gas exhausted from the fuel electrode, the anode off-gas is configured to be distributively supplied as a steam reforming gas in the steam reformer and as a combustion gas used for heating in steam reforming.

By providing this feature configuration, the anode off-gas also serves as a combustion fuel of a combustor, which is a heat source of the steam reforming reaction, and thus the reliability of the system can be improved by stabilization of the combustion due to the increase in the fuel concentration of the anode off-gas.

An eleventh feature configuration of the present invention is that a condensing means capable of removing condensed water is provided on one or both of a discharge side and a suction side of a circulating means which circulates the anode off-gas to the steam reformer, the control means adjusts a circulation amount by the circulating means and a condensation temperature in the condensing means to adjust an amount of the steam circulated to the steam reformer, in an external power supply state where generated electric power is supplied to the outside by following an electric power load, with a configuration in which only the steam circulated through the anode off-gas circulation path is allowed to flow in as steam required for the steam reformer, an appropriate S/C ratio corresponding to the electric power load is set for a S/C ratio which is a ratio of the steam circulated to the steam reformer to an amount of carbon input to the steam reformer, and the condensing means and the control means cooperate to operate as a S/C ratio adjusting means that adjusts the S/C ratio to the appropriate S/C ratio, and control the steam partial pressure of the anode off-gas circulated to the steam reformer to a steam partial pressure that allows the hydrocarbon fuel, in an amount of equal to or more than a total amount of an amount of the hydrocarbon fuel required to obtain the generated electric power and an amount of the hydrocarbon fuel required to maintain a temperature of the steam reformer at a temperature required for steam reforming with heat generated by combustion of a combustion component contained in at least a part of the anode off-gas, to be input to the steam reformer.

By adopting this feature configuration, the supply ratio between the raw fuel and the steam supplied to the steam reformer can be set to be substantially dependent on the adjustment of the steam partial pressure in the condensing means. Moreover, the condensing means and the control means are used as the adjustment means for the S/C ratio, which is the ratio between the amounts of the steam and the carbon input to the steam reformer and further the entire fuel cell system, and adjust a S/C ratio of the gas input to the steam reformer to an appropriate S/C ratio. As a result, by favorably controlling the operation of the condensing means when a load on the fuel cell fluctuates, optional change and control can be performed, and load followability and reliability of the electric power generation can be improved.

Furthermore, when the hydrocarbon fuel is to be used to cover the electric power load and to generate heat for the steam reforming, the amount of the hydrocarbon fuel needs to be commensurate with the total amount for the both cases, but by controlling the amount of the condensed water removed by the condensing means, the states of the hydrocarbon fuel and the steam on the upstream side of the steam reformer and the fuel cell can be properly controlled to be commensurate with the electric power load and the amount of the fuel required for the steam reforming, and a favorable operation can be maintained.

The method for operating the fuel cell system adopting such a configuration is that in an external power supply state where generated electric power is supplied to the outside by following an electric power load, with a configuration in which only the steam circulated through the anode off-gas circulation path is allowed to flow in as steam required for the steam reformer, an appropriate S/C ratio corresponding to the electric power load is set for a S/C ratio which is a ratio of an amount of the steam circulated to the steam reformer to an amount of carbon input to the steam reformer, the S/C ratio is adjusted to the appropriate S/C ratio, and the steam partial pressure of the anode off-gas circulated to the steam reformer is controlled to a steam partial pressure that allows the hydrocarbon fuel, in an amount of equal to or more than a total amount of an amount of the hydrocarbon fuel required to obtain the generated electric power and an amount of the hydrocarbon fuel required to maintain a temperature of the steam reformer at a temperature required for steam reforming with heat generated by combustion of a combustion component contained in at least a part of the anode off-gas, to be input to the steam reformer.

A twelfth feature configuration of the present invention is that the fuel cell is a solid oxide fuel cell.

According to this feature configuration, the fuel gas reformed by the steam reformer can be directly supplied to the solid oxide fuel cell to generate electric power.

Furthermore, the solid oxide fuel cell has an electric power generation operating temperature of 700° C. or higher, which is in a high temperature range, but highly efficient electric power generation can be realized while effectively utilizing heat in this temperature range.

DESCRIPTION OF THE INVENTION

An embodiment of the present invention will be described with reference to the drawings.

In the description, a configuration of a fuel cell system S1 according to the present invention will be described, and subsequently, a configuration of a fuel cell system S2 as a comparative example will be described.

Figure 1:
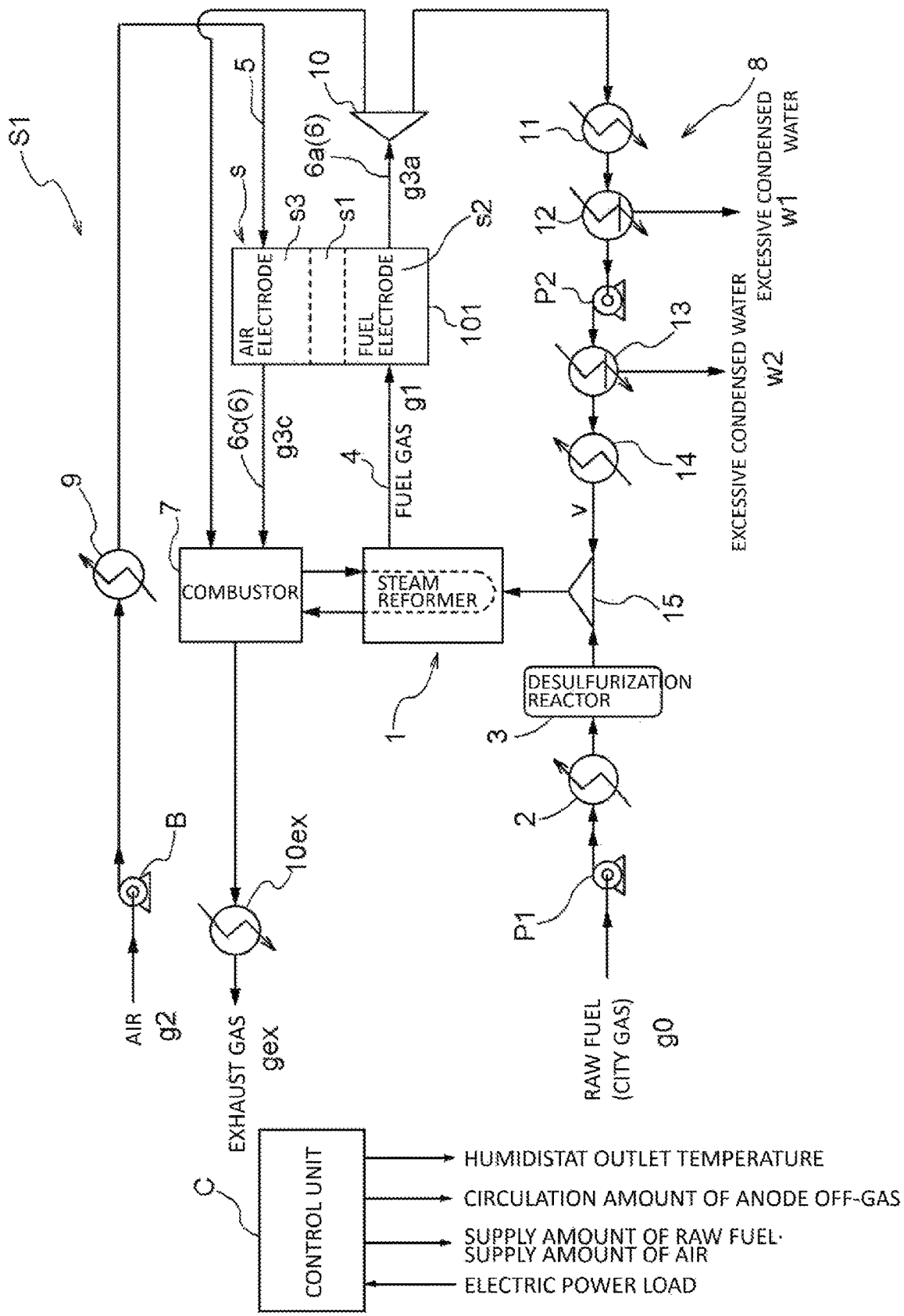
FIG. 1 is a diagram showing a configuration of a fuel cell system according to the present invention.

FIG. 1 shows the configuration of the fuel cell system S1 according to the present invention.

1. Configuration of Fuel Cell System

The fuel cell system S1 is a system constructed by adopting a solid oxide fuel cell SOFC (hereinafter, referred to as a "fuel cell body"), and is configured to include a fuel cell body 101; a fuel gas supply system 4 for supplying a fuel gas g1 (specifically, a gas containing hydrogen and carbon monoxide) to the fuel cell body 101; an oxidizing gas supply system 5 for supplying an oxidizing gas g2 (specifically, an air containing oxygen) to the fuel cell body 101; and an off-gas treatment system 6 (6a and 6c) for treating an off-gas (an anode off-gas g3a and a cathode off-gas g3c) exhausted from the fuel cell body 101 at the time of electric power generation in which the fuel cell body 101 generates electric power.

The fuel cell body 101 is connected to an electric power load (for example, a power conditioner (not shown)), and can extract the generated electric power.

The fuel cell body 101 is configured to include a large number of fuel cell stacks s, and as shown in FIG. 1, a solid oxide-type solid electrolyte s1 is configured to include a fuel electrode (anode) s2 on one surface and an air electrode (cathode) s3 on the other surface.

Here, as a constituent material of the solid oxide-type solid electrolyte s1, for example, zirconia doped with at least one selected from rare earth elements such as Y and Sc, which is YSZ, can be mentioned, and ceria doped with at least one selected from the rare earth elements, or lanthanum gallate doped with at least one selected from Sr and Mg can also be mentioned. Moreover, a composite material thereof can also be used.

For a catalyst layer serving as the fuel electrode s2, for example, a cermet of Ni and YSZ is adopted, and as a separator thereof, an alloy or oxide containing Cr, for example, a perovskite-type oxide such as a $LaCrO_3$-based oxide, a Fe—Cr alloy which is ferritic stainless steel, a Fe—Cr—Ni alloy which is austenitic stainless steel, a Ni—Cr alloy which is a nickel-based alloy, or the like can be adopted.

As a catalyst layer serving as the air electrode s3, for example, a perovskite-type oxide of $(La, AE)MO_3$ in which a part of La in $LaMO_3$ (for example, M=Mn, Fe, Co, or Ni) is substituted with an alkaline earth metal AE (AE=Sr or Ca) can be adopted, and as a separator thereof, an alloy or oxide containing Cr, for example, a perovskite-type oxide such as a $LaCrO_3$-based oxide, a Fe—Cr alloy which is ferritic stainless steel, a Fe—Cr—Ni alloy which is austenitic stainless steel, a Ni—Cr alloy which is a nickel-based alloy, or the like can be adopted.

With this configuration, at the time of the electric power generation, the fuel gas g1 is supplied to the fuel electrode s2 and the oxidizing gas g2 is supplied to the air electrode s3.

The fuel gas supply system 4 includes a steam reformer 1 as a core, which receives supply of a hydrocarbon fuel (for example, a city gas 13A containing $CH_4$ as a main component, or the like), which is a raw fuel g0, and steam v to perform steam reforming, and the fuel gas g1 obtained by the steam reforming in the steam reformer 1 is supplied to each fuel electrode s2 of the fuel cell stacks s provided in large numbers in the fuel cell body 101.

As is well known, the city gas 13A generally contains methane derived from a natural gas as a main component and also contains ethane, propane, and butane, but a sulfur-containing substance (sulfur component) such as dimethyl sulfide (DMS) and tertiary butyl mercaptan is also contained as an odorant. The sulfur-containing substance becomes a poisoning component for various devices (particularly, catalyst elements provided in the devices) which configure the fuel cell system.

In the fuel cell system S1, on an upstream side of the steam reformer 1, a raw fuel pump P1 for supplying the raw fuel g0 is provided and a heater 2 for heating the supplied raw fuel g0 and a desulfurization reactor 3 for removing a sulfur component contained in the raw fuel g0 from the raw fuel g0 are provided.

A copper-zinc-based desulfurizing agent is stored in the desulfurization reactor 3, and the sulfur component contained in the raw fuel g0 is reduced so that a sulfur content in the desulfurization reactor 3 is 1 vol. ppb or less (more preferably 0.1 vol. ppb or less). As this type of copper-zinc-based desulfurizing agent, a desulfurizing agent obtained by hydrogen reduction of a copper oxide-zinc oxide mixture prepared by a coprecipitation method using a copper compound (for example, copper nitrate, copper acetate, or the like) and a zinc compound (for example, zinc nitrate, zinc acetate, or the like), or a desulfurizing agent obtained by hydrogen reduction of a copper oxide-zinc oxide-aluminum oxide mixture prepared by a coprecipitation method using a copper compound, a zinc compound, and an aluminum compound (for example, aluminum nitrate, sodium aluminate, or the like) can be typically used.

A combustor 7 is provided for heating the steam reformer 1.

To the combustor 7, a part of the anode off-gas g3a exhausted from the fuel electrode s2 is supplied as a combustion gas and the cathode off-gas g3c exhausted from the air electrode s3 is supplied, and a combustion component (hydrogen, hydrocarbon, and carbon monoxide) contained in the anode off-gas g3a is combusted with oxygen contained in the cathode off-gas g3c. As a result, in the fuel cell system S1, the combustion component which is a fuel slipping over the fuel electrode s2 is combusted with oxygen slipping over the air electrode s3, and is used for steam reforming.

Therefore, the raw fuel g0 sucked and transported by the raw fuel pump P1 is desulfurized and flows into the steam reformer 1. The residue of the anode off-gas g3a exhausted from the fuel electrode s2 is circulated as a steam reforming gas by a circulation pump P2. The circulation path is referred to as an anode off-gas circulation path 8 in the present invention, and the circulation path 8 will be described later.

As also described above, the steam reformer 1 is thermally connected to the combustor 7 for combusting the anode off-gas g3a exhausted from the fuel cell body 101, and uses heat generated in the combustor 7 to perform steam reforming.

A steam reforming catalyst is stored in the steam reformer 1, and examples of this type of catalyst include a ruthenium-based catalyst and a nickel-base catalyst. Furthermore, specifically, a $Ru/Al_2O_3$ catalyst obtained by supporting a ruthenium component on an alumina support, a $Ni/Al_2O_3$ catalyst obtained by supporting a nickel component on an alumina support, or the like can be used.

For example, when the hydrocarbon fuel is methane, a reaction performed in the steam reformer 1 can be expressed as the following two results, and is an endothermic reaction performed by obtaining heat from the outside.

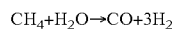

$$CH_4 + H_2O \rightarrow CO + 3H_2 \quad \text{[Chem. 1]}$$

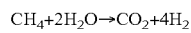

$$CH_4 + 2H_2O \rightarrow CO_2 + 4H_2 \quad \text{[Chem. 2]}$$

The oxidizing gas supply system 5 supplies the oxidizing gas g2 to each air electrode s3 of the fuel cell stacks s provided in large numbers in the fuel cell body 101.

In the fuel cell system S1 shown in the drawing, an outside air is sucked by an air blower B and the air is preheated in a heater 9 provided up to the fuel cell body 101 and is supplied to the air electrode s3. For example, a heat source for preheating the air may be an exhaust gas exhausted from the combustor 7. That is, heat of an exhaust gas gex of the combustor 7 is recovered by a heat recovery device 10ex, used for preheating the air, cooling by sending the air to the steam reformer 1 unique to the present application, and heating the anode off-gas g3a whose steam partial pressure has been adjusted, and also used for general heat utilization such as hot water supply.

The off-gas treatment system 6 includes two systems, that is, an anode off-gas treatment system 6a for receiving the off-gas from the fuel electrode s2 side of the fuel cell body 101 and a cathode off-gas treatment system 6c for receiving the off-gas from the air electrode s3 side.

The anode off-gas treatment system 6a is branched by a distributor 10 on a downstream side, one is connected to the combustor 7, and the other is connected to the steam reformer 1. The distributor 10 is configured so that the anode off-gas g3a can be distributed to the steam reformer 1 roughly in an anode off-gas amount of 3 when an anode off-gas amount sent to the combustor 7 is 1. This distribution ratio can be optionally set according to a facility condition and an operating condition of the system S1.

Regarding devices arranged in the circulation system of the anode off-gas g3a circulated to the steam reformer 1, a heat recovery device 11, a cooler 12, the circulation pump P2, a humidistat 13, and a heater 14 are arranged in this order from the distributor 10. Here, the heat recovery device 11 and the cooler 12 operate as a cooling means that gradually cools the gas g3a flowing therein in a vapor phase or a mixed phase, and condensed water w1, which is generated mainly by cooling determined by a heat-resistant temperature of a pump, is exhausted from the cooler 12. The humidistat 13 is a so-called condenser, and operates as a condensing means that condenses and removes the steam v contained in the gas g3a flowing therein and exhausts condensed water w2. Therefore, in the humidistat 13, the steam partial pressure of the gas flowing therein is adjusted according to the condensation temperature. Depending on the facility condition and the operating condition, it is possible to omit the humidistat 13 by adding a function of adjusting the condensation temperature in the humidistat 13 to the cooler 12. In the case of this configuration, the cooler 12 operates as the condensing means in the present invention. The heater 14 operates as a temperature raising means that raises the temperature of the gas g3a flowing therein in a vapor phase. Regarding the operating conditions of these devices 11, 12, P2, 13, and 14, the temperature of the gas g3a flowing through each part and the like will be described in detail in the section of the operating conditions of the fuel cell system S1, will be described later.

A part of the anode off-gas g3a whose steam partial pressure is adjusted is circulated to a mixer 15 through the circulation pump P2, used for the steam reforming in the steam reformer 1, and supplied to the fuel electrode s2 of the fuel cell body 101.

Therefore, in the fuel cell system S1, in an external power supply state where the generated electric power is supplied to the outside by following an electric power load, the steam v used for the steam reforming in the steam reformer 1 is supplied through the anode off-gas circulation path 8 (anode off-gas treatment system 6a).

FIG. 1 shows control elements forming the main part of the present invention in a control unit C of the fuel cell system S1. The control unit C receives an electric power load required for the system S1 and outputs an instruction to the raw fuel pump P1 according to the supply amount of the raw fuel required to cope with the electric power load. Furthermore, the blower B is instructed for the corresponding supply amount of the air.

In addition, in order to keep a S/C ratio in the steam reformer 1 in a desired state, the circulation pump P2 is instructed for the anode off-gas circulation amount and the humidistat 13 is instructed for a humidistat outlet temperature. As a result, the steam partial pressure of the anode off-gas g3a, which returns to the mixer 15 through the anode off-gas circulation path 8 and is mixed with the raw fuel g0, is maintained in an appropriate range, a S/C ratio which is a ratio (molar ratio) between the amounts of the steam and the carbon input to the fuel cell system S1 (specifically, input to the steam reformer 1) can be maintained in a desired state, and thus highly efficient electric power generation is performed.

Therefore, the control unit C is the control means in the present invention. In addition, the control means and the condensing means of the present invention cooperate to become a S/C ratio adjusting means of the fuel cell system S1.

Figure 2:
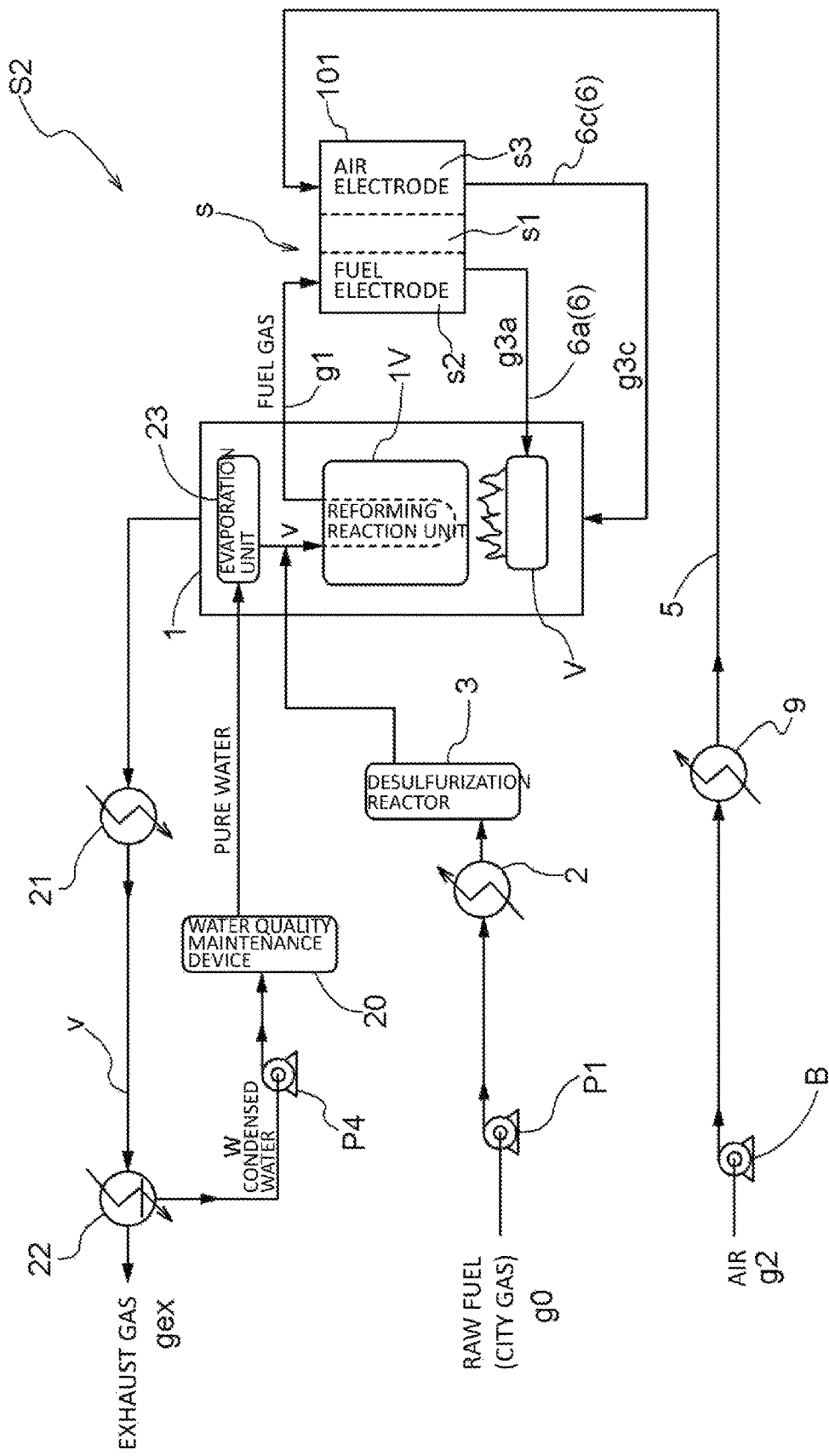
FIG. 2 is a diagram showing a configuration of a fuel cell system as a comparative example.

Subsequently, the fuel cell system S2 as the comparative example of the present invention will be described with reference to FIG. 2. In the comparative example, the same devices as those shown in FIG. 1 are designated by the same reference signs.

The fuel cell system S2 also includes the current solid oxide fuel cell SOFC as a core, but when electric power is generated using hydrocarbon as the raw fuel g0, the steam v contained in the combusted gas of the hydrocarbon fuel generated in the steam reformer 1 is condensed in a condenser 22, and the steam v obtained by evaporating the condensed water w is used for steam reforming. In this system configuration, water contained in the combusted gas is used for steam reforming, and thus a water quality maintenance device 20 is required.

There is no difference in that a fuel cell (fuel cell body 101) is provided in which the reformed gas obtained by the steam reformer 1 is supplied as the fuel gas g1 to the fuel electrode s2 and the oxidizing gas g2 is separately supplied to cause a cell reaction.

As is clear from the same drawing, the oxidizing gas supply system 5 for supplying the oxidizing gas g2 to the air electrode s3 includes the blower B and the heater 9, and the cathode off-gas g3c exhausted from the air electrode s3 is introduced to the steam reformer 1 and used for combustion in a heating burner V provided in the device. A portion surrounded by a box at a center of the steam reformer 1 is a reforming reaction unit 1V which performs steam reforming by using the steam v generated from an evaporation unit 23.

In the supply of the raw fuel g0 and the supply of the steam v with respect to the steam reformer 1, regarding the supply of the raw fuel g0, also in this example, a temperature raising operation is performed by the heater 2, then desulfurization is performed in the desulfurization reactor 3, and reforming in the steam reformer 1 is performed. On the other hand, regarding the supply of the steam v, the anode off-gas g3a is combusted in the burner V provided in the steam reformer 1, and water contained in the combusted gas is recovered through heat recovery (by the heat recovery device 21) and condensation (by the condenser 22). The condensed water w is subjected to a water quality treatment by the water quality maintenance device 20 and supplied to the steam reformer 1. Furthermore, the steam v required for reforming can be obtained by the evaporation unit 23 provided in the steam reformer 1.

In this way, the fuel gas g1 subjected to the steam reforming is supplied to the fuel electrode s2 and used for electric power generation. Here, the anode off-gas g3a exhausted from the fuel electrode s2 contains a fuel which is a combustion component, and is supplied to the burner V provided in the steam reformer 1 to be used for combustion.

Therefore, in the configuration of the comparative example, the anode off-gas circulation path 8 according to the present invention, which is described above in the embodiment, is not provided, and accordingly the distributor 10, the heat recovery device 11, the cooler 12, the circulation pump P2, the humidistat 13, and the heater 14 are not provided.

[Investigation Results]

Hereinafter, the results of the investigation on the present invention conducted by the inventor will be described.

Operating Conditions of Fuel Cell System S1

1. The anode off-gas g3a (temperature of 700° C.) exhausted from the fuel electrode s2 of the solid oxide fuel cell SOFC as the fuel cell body 101 is distributed by the distributor 10 so that the amount circulated to the steam reformer 1 side:the amount fed to the combustor 7 side is 3:1.

2. The anode off-gas g3a is cooled to about 320° C. by the heat recovery device 11, and then further cooled to about 85° C. by the cooler 12. A fluid on a heat receiving side of the heat recovery device 11 may be a gas flowing through the heater 2, 9, or 14 or the like described above. That is, the heat recovered by cooling the anode off-gas g3a can be used for reheating (temperature-raising) of the anode off-gas g3a, preheating of the oxidizing gas g2, and heating of the raw fuel g0.

Since excessive condensed water w1 is generated in the cooler 12, and hinders driving of the air pump, the condensed water w1 is exhausted.

3. The anode off-gas g3a cooled to 85° C. is pressurized at 20 kPa by the circulation pump P2, and the temperature of the anode off-gas g3a raises to 98.3° C. due to adiabatic compression accompanying the pressurization. The theoretical power of the circulation pump P2 in this case is as small as 0.66% of direct-current output of the fuel cell described later.

4. The anode off-gas g3a compressed by the circulation pump P2 is re-cooled to 88.5° C. by the humidistat 13 and excessive condensed water w2 is exhausted. The condensation temperature here determines (adjusts) the steam partial pressure of the anode off-gas g3a.

5. The anode off-gas g3a whose steam partial pressure is adjusted is heated to 300° C. by the heater 14 with heat recovered by the heat recovery device 11, and supplied together with the desulfurized raw fuel g0 to the steam reformer 1.

When the fuel cell system S1 was operated under the above operating conditions, a reaction equilibrium temperature of the steam reformer 1 could be maintained at 670° C. by setting the S/C ratio in the steam reformer 1 to 2.6 and combusting a part of the anode off-gas g3a by the combustor 7.

In addition, when the generated voltage of the fuel cell was 0.8 V during the normal operation and the fuel utilization rate ([amount of fuel consumed in fuel cell]/[amount of fuel supplied to fuel cell]) was 68.8%, alternating-current output efficiency ([alternating-current output of fuel cell]/[fuel energy (enthalpy) per unit time of city gas (13A) supplied as raw fuel to fuel cell system]) of the cell was 61.2%, and direct-current output efficiency ([direct-current output of fuel cell]/[fuel energy (enthalpy) per unit time of city gas (13A) supplied as raw fuel to fuel cell system]) was 68.3% based on the LHV standard.

In the operation example, the concentrations (corresponding to the partial pressure) of the raw fuel at the inlet and the outlet of the fuel electrode were about 0.3 vol. %, and the concentrations (corresponding to the partial pressure) of the fuel gas (hydrogen+carbon monoxide) at the inlet and the outlet of the fuel electrode were about 49 vol. % and about 15 vol. %. Moreover, the concentrations (corresponding to the partial pressure) of the steam at the inlet and the outlet of the fuel electrode were 26 vol. % and 50 vol. %.

Furthermore, about 7.45% of the steam circulated to the steam reformer 1 through the anode off-gas circulation path 8 was removed by the condensing means 12 and 13.

Hereinafter, the fuel cell system S2 as the comparative example will be described. In the investigation, regarding the specifications, the city gas (13A) was used as the raw fuel, the latest solid oxide fuel cell SOFC was incorporated, and for parameters (direct current/alternating current conversion efficiency and the like) required for the investigation, the same values were used for strict comparison except for the present invention.

In the fuel cell system S2 as the comparative example, when the S/C ratio in the steam reformer 1 is maintained at 2.6, the anode off-gas g3a can be combusted using the cathode off-gas g3c in the burner V provided in the steam reformer 1 to maintain the reaction equilibrium temperature at 670° C.

However, under this condition, when the generated voltage of the fuel cell is 0.8 V during the normal operation and the fuel utilization rate is 80.0%, the alternating-current output efficiency of the cell is 52.1%, and the direct-current output efficiency is 57.8% based on the LHV standard.

In the comparative example, the concentrations (corresponding to the partial pressure) of the raw fuel at the inlet and the outlet of the fuel electrode were about 1 vol. %, and the concentrations (corresponding to the partial pressure) of the fuel gas (hydrogen+carbon monoxide) at the inlet and the outlet of the fuel electrode were about 67 vol. % and about 14 vol. %. Moreover, the concentrations (corresponding to the partial pressure) of the steam at the inlet and the outlet of the fuel electrode were 23 vol. % and 70 vol. %. In this comparative example, the anode off-gas is used for heating in the steam reformer 1 and then merely released to the outside.

In this example, in order to obtain the same electric power generation efficiency as in the present invention, it is necessary to increase the fuel utilization rate of the fuel cell to 80.0% (fuel utilization rate)×(68.3% (direct-current output efficiency in present invention)/57.8% (direct-current output efficiency in comparative example))=94.53%. This numerical value greatly exceeds 85% to 90% of the limit value caused by fuel distribution uniformity and control error tolerance in the general industrial fuel cell system, and thus realization of the practical use becomes extremely difficult.

For this situation, in the present invention, as described above, the anode off-gas is circulated to the steam reformer 1 to reduce the fuel utilization rate and to secure the fuel partial pressure (fuel gas partial pressure) at the outlet of the fuel cell, and thus the electric power generation amount (electric power generation efficiency) can be improved.

That is, due to the circulation of the anode off-gas and the adjustment (humidity adjustment) of the steam partial pressure at the time of introduction to the steam reformer 1, the amount of the fuel supplied to the fuel cell is increased, and thus the fuel utilization rate of the fuel cell can be reduced (the consumption rate of the fuel required for the fuel cell is mitigated, which is advantageous for the fuel cell performance, and the difference in partial pressure at the inlet and the outlet of the fuel electrode is reduced, which levels the temperature distribution accompanying the electric power generation and is also advantageous for durability). On the other hand, since the gas temperature is lowered in order to use a general-purpose pump, the S/C ratio can also be adjusted to some extent close to a target value (2.6 for this time). The fuel cell system according to the present invention can be operated at the S/C ratio, for example in a range of 1.5 to 3.5 and preferably a range of 1.5 to 3.0, but since the sulfur content in the hydrocarbon fuel input to the steam reformer 1 is reduced to 1 vol. ppb, in particular, even under the condition in which the S/C ratio is in a relatively low range, the stable operation can be realized for a long period of time.

Therefore, the humidistat 13 operating as the condensing means in the present embodiment cooperates with the control unit C which is the control means to operate as a S/C ratio adjusting means that adjusts a S/C ratio which is a ratio of the amount of the steam circulated to the steam reformer 1 to the amount of the carbon input to the steam reformer 1.

In this case, from a minimum flow rate (corresponding to the minimum fuel gas concentration in the present invention) of the fuel gas at the outlet of the fuel electrode, a flow rate of the fuel gas at the inlet of the fuel electrode is calculated based on the fuel utilization rate in the fuel cell, the amount of the hydrocarbon fuel which is the raw fuel input to the steam reformer 1 is calculated based on the S/C ratio set in the steam reformer 1, and the steam amount (corresponding to the steam partial pressure) capable of introducing this amount of the raw fuel is determined.

In addition, the target value of the S/C ratio is a value which is preset as an appropriate S/C ratio corresponding to the electric power load, and the minimum fuel gas concentration (for example, 12 vol. %) is set as a minimum value of the fuel gas concentration at the outlet of the fuel electrode.

As a result, in the present embodiment, in an operation form in which in an external power supply state where the generated electric power is supplied to the outside by following the electric power load, only the steam circulated through the anode off-gas circulation path 8 is allowed to flow in as the steam v required for the steam reformer 1, and the condensing means and the control means cooperate to operate as the S/C ratio adjusting means that adjusts the S/C ratio to the appropriate S/C ratio, (1) regarding the fuel gas concentration at the outlet of the fuel electrode s2, the steam partial pressure of the anode off-gas g3*a* circulated to the steam reformer 1 is controlled to a steam partial pressure that allows the hydrocarbon fuel, in an amount capable of maintaining the fuel gas concentration at the outlet of the fuel electrode at the minimum fuel gas concentration or higher, to be input to the steam reformer 1, and (2) regarding the point of generating heat required for the steam reforming by the electric power generation commensurate with the electric power load, the steam partial pressure of the anode off-gas g3*a* circulated to the steam reformer 1 is controlled to a steam partial pressure that allows the hydrocarbon fuel, in an amount of equal to or more than a total amount of the amount of the hydrocarbon fuel required to obtain the generated electric power and the amount of the hydrocarbon fuel required to maintain the temperature of the steam reformer 1 at a temperature required for steam reforming with the heat generated by combustion of the combustion component contained in at least a part of the anode off-gas, to be input to the steam reformer 1.

Another Embodiment (1) In the above embodiment, the configuration in which the heat recovery device 11, the cooler 12, the circulation pump P2 as the circulating means, the humidistat 13 as the condensing means, and the heater 14 are provided in the anode off-gas circulation path 8 is shown. In the present invention, the amount of the steam circulated to the steam reformer 1 through the anode off-gas circulation path 8 may be properly adjusted, and it does not matter how to cool the anode off-gas or how to raise temperature after adjustment of the steam partial pressure (after the removal of the condensed water). For example, by using a single means without separately providing the heat recovery device 11 and the cooler 12, the anode off-gas may be cooled to the condensable state. Therefore, a means that cools the anode off-gas before the adjustment of the steam partial pressure is referred to as a cooling means.

On the other hand, after the adjustment of the steam partial pressure, the temperature of the anode off-gas may be raised to a state suitable for the steam reforming in the steam reformer, and the means is referred to as a temperature raising means.

Here, these are functions of the cooler 12 and the humidistat 13, but as also described in the above embodiment, depending on the facility condition and the operating condition, it is possible to omit the humidistat 13 by adding a function of adjusting the condensation temperature to the cooler 12. When the omission is performed in this way, the cooler 12 functions as the cooling means and the condensing means in the present invention.

The installation position of the condensing means in the anode off-gas circulation path 8 may be one or both of the discharge side (the condenser 13 in the previous embodiment) and the suction side (the cooler 12 in the previous embodiment) of the circulating means. Accordingly, one or both of the cooler 12 and the humidistat 13 may be provided.

(2) In the above embodiment, the fuel cell system has been described mainly with respect to the state (external power supply state) where the generated electric power is supplied to the outside by following the electric power load.

As described above, during such a normal operation, the fuel cell system S1 can favorably generate electric power with only the steam contained in the anode off-gas circulated to the steam reformer 1 through the anode off-gas circulation path 8, but for example, at the time of starting the operation of the fuel cell system S1 and before the electric power is supplied to the outside, the steam v in addition to the raw fuel may be supplied to the steam reformer 1 through the raw fuel supply system to supply the steam required when starting the operation of the cell to the steam reformer 1.

(3) In the above embodiment, as the operating condition thereof, in the anode off-gas circulation path 8, the anode off-gas was cooled to 85° C., but from the viewpoint in which general-purpose products are adopted for the circulation pump P2 and the humidistat 13, cooling to a temperature of higher than 50° C. and lower than 250° C. is preferable.

(4) In the above embodiment, the steam reforming reaction has been mainly described, but a reforming reaction in which the steam reforming reaction and the partial combustion reforming reaction are combined or a reforming reaction in which the steam reforming reaction and the carbon dioxide reforming (dry reforming) are combined can also be used.

Figure 3:
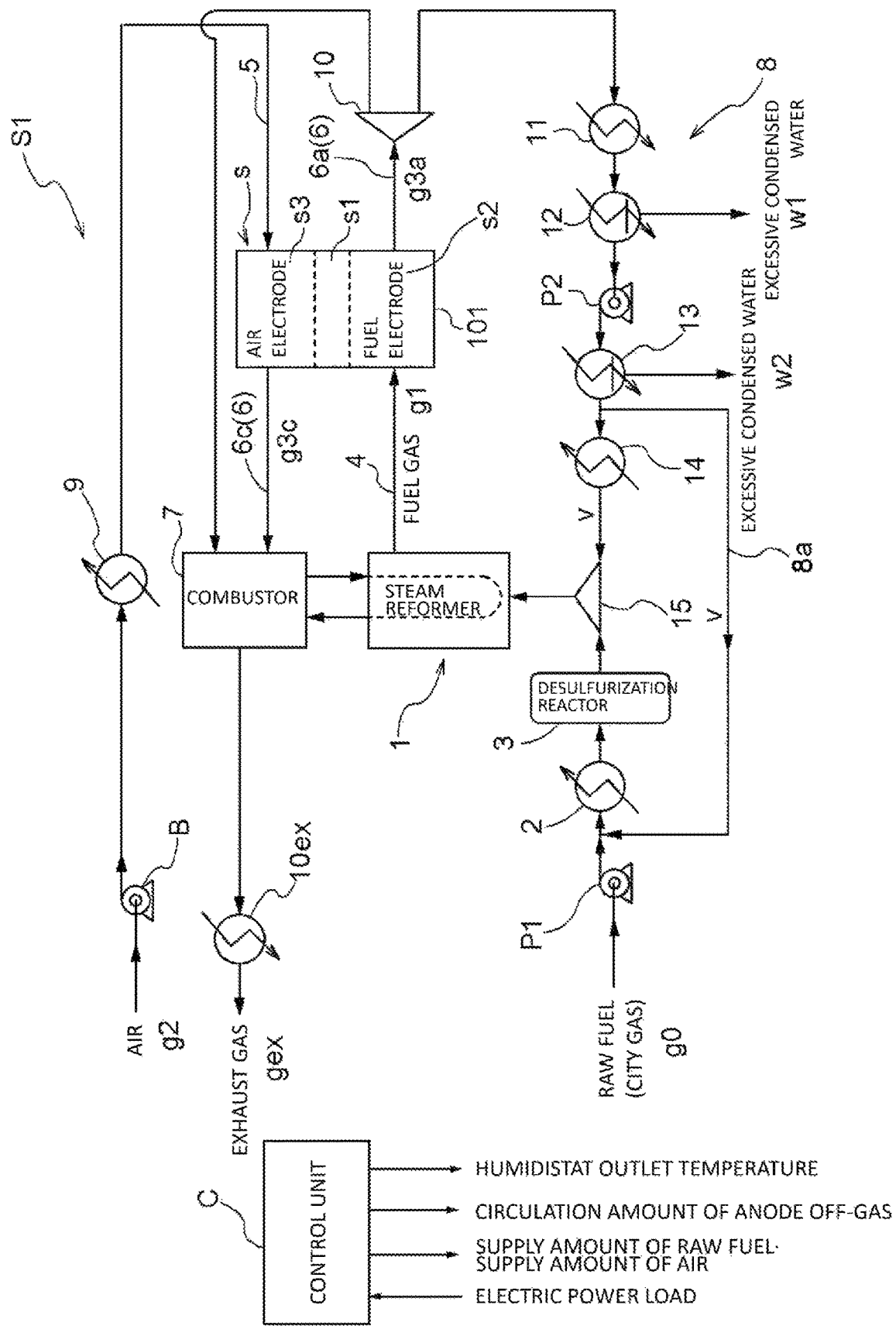
FIG. 3 is a diagram showing another embodiment of the fuel cell system according to the present invention.

(5) In the above embodiment, the steam supplied to the steam reformer 1 was the steam v which is introduced into the mixer 15 through the heater 14. However, as shown in FIG. 3, at least a part of the anode off-gas g3*a* which is discharged from the humidistat 13 and whose steam partial pressure is reduced may be introduced to the upstream side of the heater 2 through a branch path 8*a*, mixed with the raw fuel, and heated by the heater 2 to be introduced into the desulfurization reactor 3. Consequently, the anode off-gas g3*a* whose steam partial pressure is reduced can be used for the desulfurization.

The invention claimed is:

1. A fuel cell system comprising:
a steam reformer that reforms a hydrocarbon fuel by a steam reforming reaction;
a fuel cell that operates by introducing a reformed gas obtained by the steam reformer to a fuel electrode;
an anode off-gas circulation path that removes condensed water while cooling an anode off-gas exhausted from the fuel electrode, and introduces the anode off-gas to the steam reformer; and
a control unit configured to:
adjust an amount of the condensed water removed from the anode off-gas circulation path, and control a steam partial pressure of the anode off-gas circulated to the steam reformer;
adjust an S/C ratio of an appropriate S/C ratio, wherein in an external power supply state where generated electric power is supplied to an outside by following an electric power load, with a configuration in which only the steam circulated through the anode off-gas circulation path is allowed to flow in as steam required for the steam reformer, with respect to the electric power load, the appropriate S/C ratio is preset for the S/C ratio which is a ratio of an amount of the steam circulated to the steam reformer to an amount of carbon input to the steam reformer, and a minimum fuel gas concentration is set for a fuel gas concentration at the outlet of the fuel electrode; and control the steam partial pressure of the anode off-gas circulated to the steam reformer to a steam partial pressure that allows the hydrocarbon fuel, in an amount sufficient to maintain the fuel gas concentration at the outlet of the fuel electrode at the minimum fuel gas concentration or higher, to be input to the steam reformer.

2. The fuel cell system according to claim 1, further comprising:

a condensing means configured to remove condensed water, provided on one or both of a discharge side and a suction side of a circulating means which circulates the anode off-gas to the steam reformer, wherein the control unit adjusts a circulation amount by the circulating means and a condensation temperature in the condensing means to adjust an amount of steam circulated to the steam reformer.

3. The fuel cell system according to claim 2, wherein in the anode off-gas circulation path, a cooling means that cools the anode off-gas flowing in the anode off-gas circulation path is provided between the condensing means and the fuel cell, and a temperature raising means that raises a temperature of the anode off-gas flowing in the anode off-gas circulation path is provided between the condensing means and the steam reformer.

4. The fuel cell system according to claim 3, wherein heat recovered by the cooling means is used in the temperature raising means.

5. The fuel cell system according to claim 1, wherein in the anode off-gas circulation path, the anode off-gas is cooled to a temperature of higher than 50° C. and lower than 250° C.

6. The fuel cell system according to claim 2, wherein the condensing means and the control unit cooperate to operate as a S/C ratio adjusting means that adjusts the S/C ratio.

7. The fuel cell system according to claim 1, further comprising:

a desulfurization reactor that removes a sulfur component supplied together with the hydrocarbon fuel; and a path that supplies at least a part of the anode off-gas whose steam partial pressure is reduced to the desulfurization reactor.

8. The fuel cell system according to claim 1, further comprising:

a desulfurization reactor that removes a sulfur component supplied together with the hydrocarbon fuel, wherein the hydrocarbon fuel desulfurized so as to have a sulfur content of 1 vol. ppb or less in the desulfurization reactor is supplied to the steam reformer.

9. The fuel cell system according to claim 1, wherein regarding the anode off-gas exhausted from the fuel electrode, the anode off-gas is configured to be distributively supplied as a steam reforming gas in the steam reformer and as a combustion gas used for heating in steam reforming.

10. The fuel cell system according to claim 1, wherein the fuel cell is a solid oxide fuel cell.

11. A method for operating a fuel cell system, the fuel system comprising:

a steam reformer that reforms a hydrocarbon fuel by a steam reforming reaction; a fuel cell that operates by introducing a reformed gas obtained by the steam reformer to a fuel electrode; and an anode off-gas circulation path that removes condensed water while cooling an anode off-gas exhausted from the fuel electrode, and introduces the anode off-gas to the steam reformer, the method comprising:

adjusting an amount of condensed water removed from the anode off-gas circulation path to adjust a steam partial pressure of the anode off-gas circulated to the steam reformer;

adjusting an S/C ratio to an appropriate S/C ratio, wherein in an external power supply state where generated electric power is supplied to an outside by following an electric power load, with a configuration in which only the steam circulated through the anode off-gas circulation path is allowed to flow in as steam required for the steam reformer, with respect to the electric power load, the appropriate S/C ratio is preset for the S/C ratio which is a ratio of an amount of the steam circulated to the steam reformer to an amount of carbon input to the steam reformer, and a minimum fuel gas concentration is set for a fuel gas concentration at the outlet of the fuel electrode; and controlling the steam partial pressure of the anode off-gas circulated to the steam reformer to a steam partial pressure that allows the hydrocarbon fuel, in an amount sufficient to maintain the fuel gas concentration at the outlet of the fuel electrode at the minimum fuel gas concentration or higher, to be input to the steam reformer.

12. The method for operating a fuel cell system according to claim 11, wherein a condensing means capable of removing condensed water is provided on one or both of a discharge side and a suction side of a circulating means which circulates the anode off-gas to the steam reformer, and the circulation amount by the circulating means and the condensation temperature in the condensing means are adjusted to adjust an amount of the steam circulated to the steam reformer.

13. The method for operating a fuel cell system according to claim 12, wherein in an external power supply state where generated electric power is supplied to an outside by following an electric power load, with a configuration in which only the steam circulated through the anode off-gas circulation path is allowed to flow in as steam required for the steam reformer, the condensing means is operated as a S/C ratio adjusting means that adjusts a S/C ratio, which is a ratio of the amount of the steam circulated to the steam reformer to an amount of carbon input to the steam reformer.

14. The method for operating a fuel cell system according to claim 11, wherein a desulfurization reactor that removes a sulfur component supplied together with the hydrocarbon fuel is provided, and the method further comprises supplying at least a part of the anode off-gas whose steam partial pressure is reduced to the desulfurization reactor.

15. The method for operating a fuel cell system according to claim 11, wherein a desulfurization reactor that removes a sulfur component supplied together with the hydrocarbon fuel is provided, and the method further comprises desulfurizing a sulfur content to 1 vol. ppb or less in the desulfurization reactor and supplying the hydrocarbon fuel to the steam reformer.

16. A fuel cell system comprising:
a steam reformer that reforms a hydrocarbon fuel by a steam reforming reaction;
a fuel cell that operates by introducing a reformed gas obtained by the steam reformer to a fuel electrode;
an anode off-gas circulation path that removes condensed water while cooling an anode off-gas exhausted from the fuel electrode, and introduces the anode off-gas to the steam reformer;
a circulation pump provided in the anode off-gas circulation path as circulation means;
a humidistat provided as condensing means between the circulation pump and the steam reformer, the humidistat being configured to condense steam contained in the anode-off gas and exhaust the gas as condensed water, wherein the anode off-gas in which the condensed water is removed circulates in the anode off-gas circulation path by the circulation pump; and
a control unit configured to adjust an amount of the condensed water removed from the anode off-gas circulation path, and control a steam partial pressure of the anode off-gas circulated to the steam reformer.

17. The fuel cell system according to claim 16, further comprising:
a cooler provided between the fuel electrode and the circulation pump as condensing means configured to exhaust the condensed water,
wherein the control unit adjusts a circulation amount by the circulating means and a condensation temperature in the condensing means to adjust an amount of steam circulated to the steam reformer.

18. The fuel cell system according to claim 17, further comprising:
wherein in the anode off-gas circulation path, a heat recovery device that recovers heat from the anode off-gas flowing in the anode off-gas circulation path is provided between the cooler and the fuel electrode; and
a heater that raises a temperature of the anode off-gas flowing in the anode off-gas circulation path is provided between the humidistat and the steam reformer.

19. A method for operating a fuel cell system, the fuel cell system comprising:
a steam reformer that reforms a hydrocarbon fuel by a steam reforming reaction;
a fuel cell that operates by introducing a reformed gas obtained by the steam reformer to a fuel electrode;
an anode off-gas circulation path that removes condensed water while cooling an anode off-gas exhausted from the fuel electrode, and introduces the anode off-gas to the steam reformer;
a circulation pump provided in the anode off-gas circulation path as circulation means;
a humidistat provided as condensing means between the circulation pump and the steam reformer, the humidistat being configured to condense steam contained in the anode-off gas and exhaust the gas as condensed water, wherein the anode off-gas in which the condensed water is removed circulates in the anode off-gas circulation path through the circulation pump; and
a control unit configured to adjust an amount of the condensed water removed from the anode off-gas circulation path, and control a steam partial pressure of the anode off-gas circulated to the steam reformer,
wherein the anode off-gas is cooled to a temperature higher than 50° C. and lower than 250° C. in the anode off-gas circulation path.

20. The method for operating a fuel cell system according to claim 19,
wherein the control unit adjusts a circulation amount by the circulating means and a condensation temperature in the condensing means to adjust an amount of steam circulated to the steam reformer.

21. The method for operating a fuel cell system according to claim 20,
wherein in the anode off-gas circulation path, a heat recovery device that recovers heat from the anode off-gas flowing in the anode off-gas circulation path is provided between the cooler and the fuel electrode; and
a heater that raises a temperature of the anode off-gas flowing in the anode off-gas circulation path is provided between the humidistat and the steam reformer.

* * * * *